US012196199B2

(12) United States Patent
Kumar et al.

(10) Patent No.: US 12,196,199 B2
(45) Date of Patent: Jan. 14, 2025

(54) INTERMITTENT FLUSHING PLUNGER PACKING ASSEMBLY

(71) Applicant: SPM Oil & Gas Inc., Fort Worth, TX (US)

(72) Inventors: Chandu Kumar, Fort Worth, TX (US); Joe Allen Sutton, Weatherford, TX (US); Wesley P. Clark, Weatherford, TX (US); John McCrady, Burleson, TX (US); Richard David Peer, Tomball, TX (US); Bryan Wagner, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 17/907,092

(22) PCT Filed: Mar. 23, 2021

(86) PCT No.: PCT/US2021/023750
§ 371 (c)(1),
(2) Date: Sep. 22, 2022

(87) PCT Pub. No.: WO2021/195127
PCT Pub. Date: Sep. 30, 2021

(65) Prior Publication Data
US 2024/0218870 A1 Jul. 4, 2024

Related U.S. Application Data

(60) Provisional application No. 62/993,543, filed on Mar. 23, 2020.

(51) Int. Cl.
*F04B 53/02* (2006.01)
*F04B 53/14* (2006.01)
(Continued)

(52) U.S. Cl.
CPC ............ *F04B 53/143* (2013.01); *F04B 53/02* (2013.01); *F16J 15/183* (2013.01); *F16J 15/406* (2013.01)

(58) Field of Classification Search
CPC ....... F04B 53/02; F04B 53/143; F16J 15/182; F16J 15/183; F16J 15/004; F16J 15/18; F16J 15/184
See application file for complete search history.

(56) References Cited

U.S. PATENT DOCUMENTS

| 3,834,715 A | 9/1974 | Butler |
| 4,440,404 A * | 4/1984 | Roach .................... F16J 15/166 277/584 |

(Continued)

OTHER PUBLICATIONS

International Search Report and Written Opinion issued in Application No. PCT/US2021/023750; Dated Jun. 22, 2021, 9 Pages.

*Primary Examiner* — Michael Leslie

(57) ABSTRACT

An intermittent flushing plunger packing assembly is described herein. The packing assembly includes a plurality of annular seals disposed about the plunger configured to reciprocate along a linear axis within the fluid bore of the pump, and an annular packing nut disposed circumferentially about the plunger and configured to retain the plurality of annular seals and adjust a combined height of the plurality of annular seals. A selected one of the plurality of annular seals proximate to the fluid cylinder of the pump has a flushing fluid chamber in fluid communication with a flushing fluid port coupled to a first one-way check valve allowing a pressurized flushing fluid to be introduced and retained within the flushing fluid chamber and creating a fluid barrier to prevent frac fluid in the fluid cylinder from bypassing the annular seals.

18 Claims, 3 Drawing Sheets

(51) Int. Cl.
  *F16J 15/18* (2006.01)
  *F16J 15/40* (2006.01)

(56) References Cited

U.S. PATENT DOCUMENTS

| | | | | |
|---|---|---|---|---|
| 4,478,423 | A * | 10/1984 | Hjelsand | F16J 15/183 |
| | | | | 277/516 |
| 4,963,077 | A | 10/1990 | Besic et al. | |
| 6,234,490 | B1 | 5/2001 | Champlin | |
| 10,837,556 | B2 * | 11/2020 | Chase | F04B 53/02 |
| 11,002,120 | B1 * | 5/2021 | Surjaatmadja | F04B 53/02 |
| 11,421,679 | B1 * | 8/2022 | Mullins | F04B 53/164 |
| 12,018,676 | B2 * | 6/2024 | Chase | F04B 53/164 |
| 2002/0159823 | A1 | 10/2002 | Aday et al. | |
| 2023/0041201 | A1 * | 2/2023 | Myers | F16J 15/002 |

\* cited by examiner

INTERMITTENT FLUSHING PLUNGER PACKING ASSEMBLY

CROSS-REFERENCE TO RELATED APPLICATIONS

This Patent Application is a 371 national stage of PCT Application No. PCT/US2021/023750 filed on Mar. 23, 2021, entitled "INTERMITTENT FLUSHING PLUNGER PACKING ASSEMBLY," which claims priority to U.S. Provisional Application No. 62/993,543, filed on Mar. 23, 2020, entitled "INTERMITTENT FLUSHING PLUNGER PACKING ASSEMBLY," and assigned to the assignee hereof. The disclosures of the prior Applications are considered part of and are incorporated by reference into this Patent Application.

FIELD

The present disclosure relates to positive displacement pumps, and in particular, to an intermittent flushing plunger packing assembly for positive displacement pumps.

BACKGROUND

Hydraulic fracturing (a.k.a. fracking) is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried.

Positive displacement pumps are commonly used in oil fields for high pressure hydrocarbon recovery applications, such as injecting the fracking fluid down the wellbore. A positive displacement pump typically has two sections, a power end and a fluid end. The power end includes a crankshaft powered by an engine that drives the plungers. The fluid end of the pump includes cylinders into which the plungers operate to draw fluid into the fluid chamber and then forcibly push out at a high pressure to a discharge manifold, which is in fluid communication with a well head. A seal assembly, also called a packing assembly or stuffing box, is disposed in the cylinder chamber of the pump housing and is used to prevent leakage of frac fluid from around the plunger during pumping operations.

DETAILED DESCRIPTION

Conventional seal packing technology utilizes several different types of metallic and/or elastomer seal components inserted into a stuffing box during installation into the fluid end of a pump. The seal packing assembly may include, multiple individual annular metallic and/or elastomer seal components inserted into a stuffing box successively to form the packing during installation. This seal stack is retained by a packing nut that is also installed in the machined contours and threading in the fluid end. The packing nut preloads and energizes the seals to ensure their positive engagement with the plunger. The typical seal stack includes a junk ring, header ring, pressure ring, adapter, spacer, lantern ring, and wiper ring. In the conventional seal stack configuration, a lubrication port is formed in the lantern ring to allow a lubrication or coolant fluid to be supplied to the seal stack. The lantern ring is typically one of the seals that is the furthest from the pressure chamber. Sand and other abrasive elements in the frac fluid have a tendency to migrate past the junk ring and header ring, typically closest to the pressure chamber, and end up at the interface between the plunger and the packing seals. There, the stroking action of the plunger causes abrasion and damage to surfaces of the plunger and the seals, which in turn leads to premature wear, leaks, and seal failure.

Figure 1:
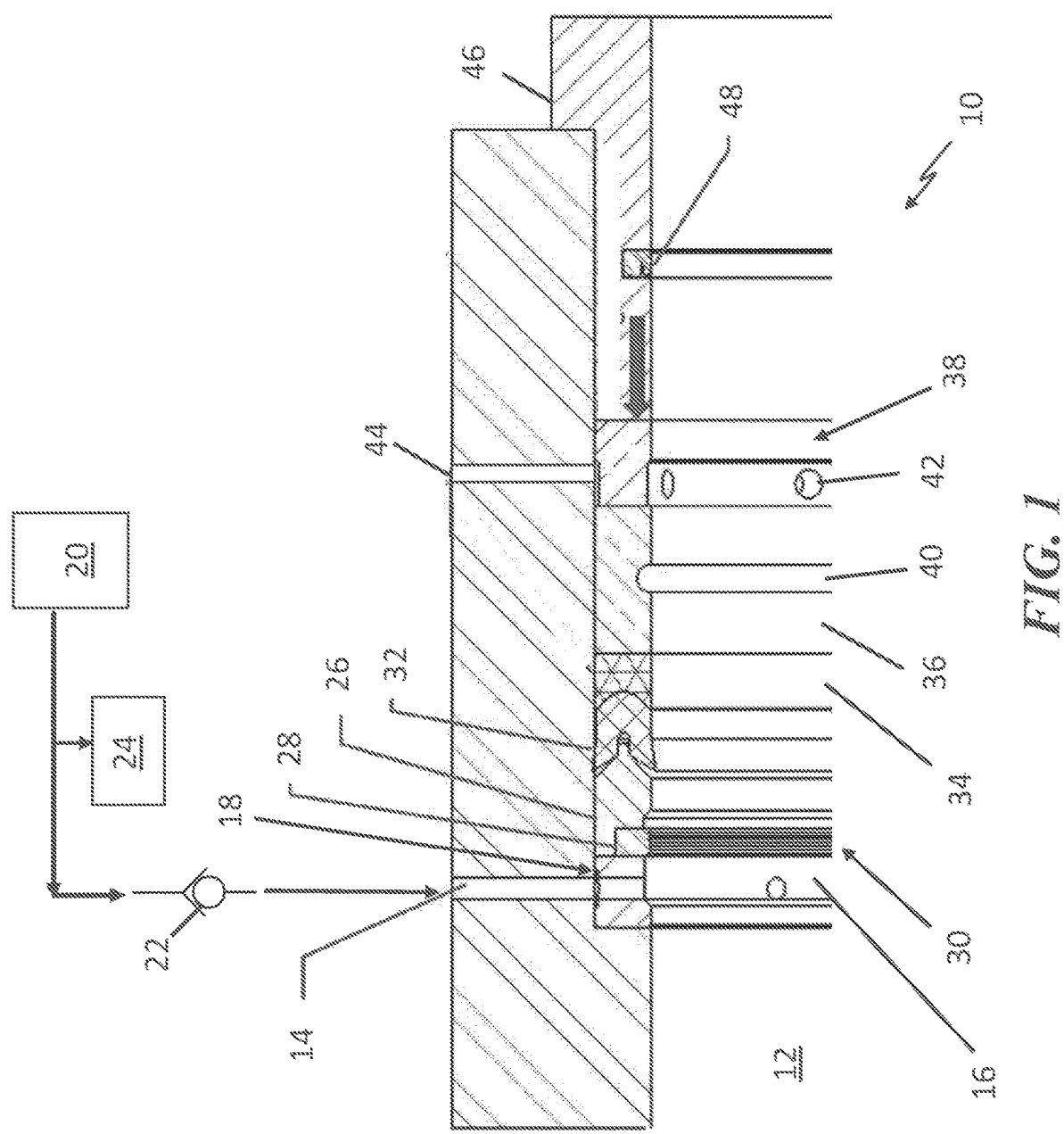
FIG. 1 is a partial cross-sectional side view of an example embodiment of an intermittent flushing plunger packing assembly for a reciprocating pump according to the teachings of the present disclosure.

FIG. 1 is a partial cross-sectional side view of an example embodiment of an intermittent flushing plunger packing assembly 10 for a reciprocating pump. The innovation described herein is to inject a pressurized flushing fluid at one of the seals closest to the pressure chamber 12, such as adding a flushing fluid port 14 and a cavity that forms a flushing chamber 16 in the junk ring. The function of the flushing chamber ring or modified junk ring 16 is to keep the "junk" in the frac fluid out of the seal stack. The use of a pressurized flushing fluid around the flushing chamber ring 16 creates an added barrier that would prevent entry by the frac fluid. The flushing fluid is drawn from a fluid source 20 and is pressurized with a pump (not shown) to supply the flushing fluid to a flushing chamber/cavity 16 incorporated in the first seal component 18 of the seal stack via a check valve 22 in a flushing port 14. Previously called a junk ring, this new seal can be termed the "flushing chamber ring." or "flushing cavity ring" 18.

The flushing fluid for the flushing chamber may be any suitable clean fluid such as water, lubrication fluid, etc. The check valve 22 ensures that fluid can only enter the flushing fluid chamber 16 in the seal stack and not allow the high pressure frac fluid to enter. The amount of flushing fluid that is consumed or supplied to the flushing chamber ring 18 can be monitored using a suitable monitor (including, e.g., flow, temperature, and pressure sensor(s), microprocessor/microcontroller, and data communication interface) 24 to help assess the health of the system. For example, if a greater than normal amount of flushing fluid is being consumed, then it may indicate that the flushing fluid is escaping into the fluid cylinder and that the packing seals are worn and should be replaced. If little or no flushing fluid is being consumed, then it may indicate that the check valve 22, the fluid source 20, and/or flushing fluid pump may be malfunctioning. Therefore, the monitor 24 may provide data that may be used to assess the operating status of the seal stack.

Behind the flushing cavity ring 18 is a header ring 26 that incorporates a scraper 28 that has an inner diameter profile defined by a plurality annular ridges 30. These ridges 30 provide additional barriers against entry by sand and other elements in the frac fluid. A pressure ring 32, adapter 34, spacer 36, and lantern ring 38 are the remaining components of the seal stack. The spacer 36 may incorporate an annular groove 40. The lantern ring 38 may incorporate passages 42 to allow a lubrication fluid to enter the seal stack via a lubrication port 44. A packing nut 46 is securely fastened in the plunger bore against the seal stack, which energizes the packing stack, and adjusts the height of the packing stack and the packing load. The packing nut 46 may incorporate a wiper seal 48 as shown in FIG. 1.

Figure 2:
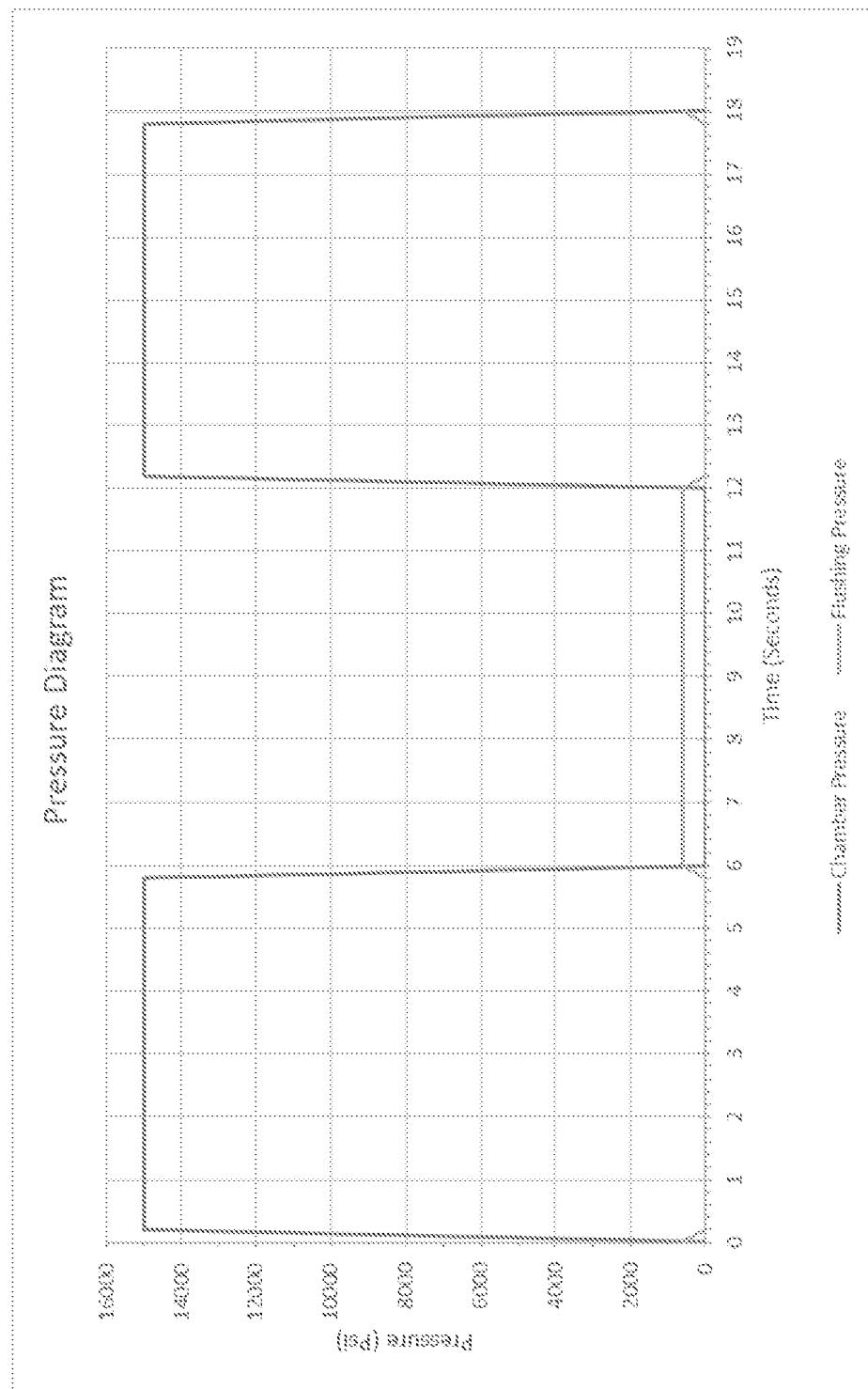
FIG. 2 is a pressure versus time plot of an example embodiment of an intermittent flushing plunger packing assembly for a reciprocating pump according to the teachings of the present disclosure.

FIG. 2 is a pressure versus time plot of the flushing fluid and frac fluid in a preferred operation of the intermittent flushing fluid plunger packing assembly 10 in the positive displacement pump. It may be seen that the clean flushing fluid is injected at approximately 300-500 psi during the retraction portion of the stroke. During the discharge portion of the stroke, the flushing fluid can be lowered to near zero pressure. Alternatively, the flushing fluid can be maintained at a constant pressure that is always greater than the fluid cylinder pressure during the retraction portion of the stroke. By injecting a clean flushing fluid into the flushing chamber 16 in the flushing cavity ring 18, a liquid barrier is created between the elastomer header ring 26 and the frac fluid. The use of the pressurized flushing fluid in the flushing cavity ring 18 or another seal element close to the fluid cylinder helps to reduce the amount of sand and other corrosive elements in the frac fluid that would get past the junk ring and header ring, and to lessen the amount of premature wear and abrasion in the plunger and seal elements. As a result, the packing seal would last substantially longer and the cost of maintenance and repairs would be drastically decreased.

Figure 3:
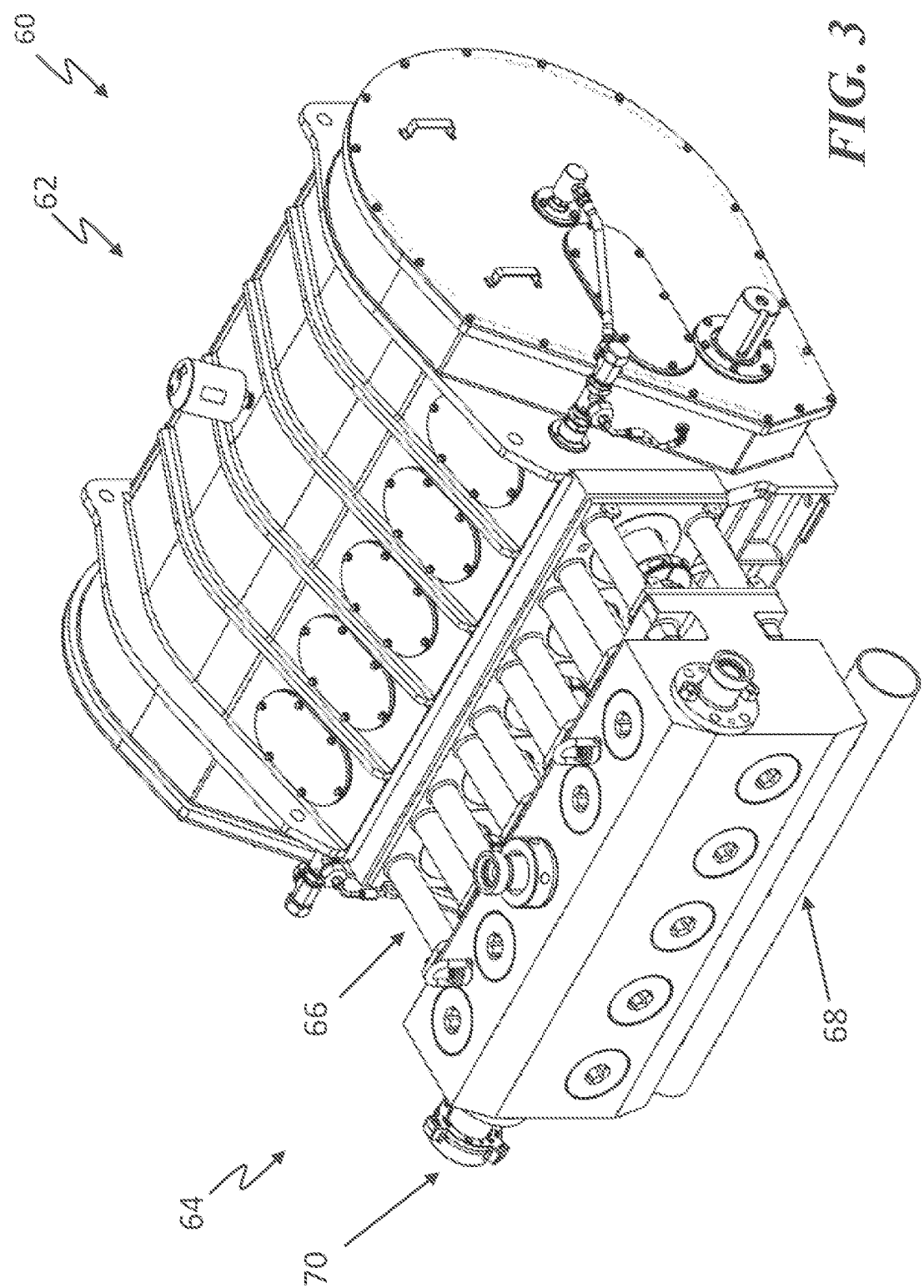
FIG. 3 is a perspective view of an embodiment of an example embodiment of a positive displacement pump according to the teachings of the present disclosure.

FIG. 3 is a pictorial representation of an exemplary positive displacement pump 60 that may incorporate the intermittent flushing plunger packing assembly 10 described herein. The positive displacement pump 60 has two sections, a power end 62 and a fluid end 64. The fluid end 64 of the pump 60 includes a fluid end block or fluid cylinder, which is connected to the power end housing via a plurality of stay rods 66. In operation, the crankshaft (not explicitly shown) reciprocates a plunger rod assembly between the power end 62 and the fluid end 64. The crankshaft is powered by an engine or motor (not explicitly shown) that drives a series of plungers (not explicitly shown) to create alternating high and low pressures inside a fluid chamber. The cylinders operate to draw fluid from a suction manifold 68 into the fluid chamber and then discharge the fluid at a high pressure to a discharge manifold 70. The discharged liquid is then injected at high pressure into an encased wellbore. The injected fracturing fluid is also commonly called a slurry, which is a mixture of water, proppants (silica sand or ceramic), and chemical additives. The pump 60 can also be used to inject a cement mixture down the wellbore for cementing operations. The pump 60 may be freestanding on the ground, mounted to a skid, or mounted to a trailer.

In a typical positive displacement pump as shown in FIG. 3, the crankshaft is mechanically connected to a motor. In one embodiment, a gear is mechanically connected to the crankshaft and is rotated by the motor through additional gears. A connecting rod connects to a crosshead through a wrist pin, which holds the connecting rod longitudinally relative to the crosshead. The connecting rod is pivotally secured by a bushing, which holds the connecting rod longitudinally relative to the crosshead. The connecting rod pivots within the crosshead bushing as the crankshaft rotates with the other end of the connecting rod. A pony rod extends from the crosshead in a longitudinally opposite direction from the crankshaft. The connecting rod and the crosshead convert the rotational movement of the crankshaft into the longitudinal movement of the pony rod, which is connected to a plunger that draws and pushes the pump fluid passing through the cylinder housing. The plunger extends through a plunger bore and into a pressure chamber formed inside the fluid cylinder.

It should be noted that the intermittent flushing plunger packing assembly 10 may be utilized in pumps of other configurations, such as a linearly actuated pump having a centrally-disposed drive system coupled to two fluid ends at either end along the linear axis, where the drive system drives the plunger rod to move the fluid in both fluid ends. In an example embodiment, an electric linear pumps may use a planetary screw drive (e.g., planetary gears surrounding a threaded rod to convert rotational motion of the planetary gears to the linear translation movement of the threaded rod) to linearly move (i.e., translate) plunger rods instead of the traditional diesel engines. The threaded rod coupled to the drive system has plunger sections on both ends such that when the plunger rod moves in either direction, one of the two ends will be pumping out fluids while the other drawing in fluids. In other embodiments, the electric actuator may be in the form of a winding that uses electric current to create a magnetic field to move the rod along its axis (e.g., similar to solenoid actuation). A fluid end is coupled with each of the two plunger ends to control fluid charging on the suction stroke and pressure discharge on the power stroke.

The intermittent flushing plunger packing assembly 10 may be utilized in a second embodiment of the linear actuated pump that includes a centrally-disposed fluid end coupled to two hydraulic actuators on its two sides along a linear axis. The hydraulic actuators are in fluid communication with a hydraulic drive system that incorporates a planetary screw drive or a solenoid drive system. In this configuration, the stroke length of each plunger rod can be halved and a smaller screw drive system may be employed and still achieve the same horsepower and fluid rate output as in the first embodiment pump described above. In this more compact configuration, the overall length of the pump assembly is reduced by the size of one fluid end. Further, because of the shorter stroke length, it is easier to achieve and maintain accurate alignment of the fluid end and hydraulic drive components.

The features of the present invention which are believed to be novel are set forth below with particularity in the appended claims. However, modifications, variations, and changes to the exemplary embodiments described above will be apparent to those skilled in the art, and the intermittent flushing plunger packing assembly for the packing bore described herein thus encompasses such modifications, variations, and changes and are not limited to the specific embodiments described herein.

What is claimed is:

1. A packing assembly for a plunger in a fluid bore of a reciprocating pump, the packing assembly comprising:
   a plurality of annular seals disposed about the plunger, which is configured to reciprocate along a linear axis within the fluid bore of the pump;
   an annular device disposed circumferentially about the plunger and configured to retain the plurality of annular seals and adjust a combined height of the plurality of annular seals; and
   wherein at least one selected one of the plurality of annular seals proximate to a fluid cylinder of the pump further having a flushing fluid chamber in fluid communication with a flushing fluid port coupled to a first one-way check valve allowing a pressurized flushing fluid to be introduced and retained within the flushing fluid chamber and creating a fluid barrier to prevent frac fluid in the fluid cylinder from bypassing the at least one selected one of the plurality of annular seals, and provide lubrication between the plunger and the plurality of annular seals.

2. The packing assembly of claim 1, wherein the at least one selected one of the plurality of annular seals comprises a flushing chamber ring having the flushing fluid chamber and the flushing fluid port.

3. The packing assembly of claim 1, wherein the plurality of annular seals comprises:
   a flushing chamber ring having the flushing fluid chamber and the flushing fluid port;
   a scraper having a plurality of ridges disposed next to the flushing chamber ring;
   a header ring encasing the scraper and disposed next to the flushing chamber ring;
   a pressure ring disposed next to the header ring;
   an adapter disposed next to the pressure ring;
   a spacer having an annular groove and disposed next to the adapter; and
   a lantern ring having a lubrication port in fluid communication with a lubrication fluid.

4. The packing assembly of claim 1, wherein the plurality of annular seals comprises a flushing chamber ring having the flushing fluid chamber and the flushing fluid port and at least one of:
   a scraper having a plurality of ridges disposed next to the flushing chamber ring;
   a header ring encasing the scraper and disposed next to the flushing chamber ring;
   a pressure ring;
   an adapter;
   a spacer; and
   a lantern ring having a lubrication port in fluid communication with a lubrication fluid.

5. The packing assembly of claim 1, further comprising a sensor configured to measure an amount of the pressurized flushing fluid supplied to the flushing fluid chamber to assess a condition of the packing assembly.

6. A method of operating a reciprocating plunger in a pump, comprising injecting a pressurized flushing fluid into a flushing chamber defined within a selected one of a plurality of annular seals disposed about the plunger in a fluid bore of the pump during at least a retraction portion of a stroke performed by the plunger, wherein injecting the pressurized flushing fluid into the flushing chamber defined within a selected one of a plurality of annular seals comprises injecting the flushing fluid into the flushing chamber of an annular seal that is closest to a fluid cylinder of the pump.

7. The method of claim 6, wherein injecting the pressurized flushing fluid into the flushing chamber defined within a selected one of a plurality of annular seals comprises injecting the flushing fluid into the flushing chamber of a flushing cavity ring disposed adjacent to the fluid cylinder of the pump.

8. The method of claim 6, further comprising monitoring an amount of the pressurized flushing fluid supplied to the flushing chamber to assess a health of the plurality of annular seals.

9. The method of claim 6, further comprising monitoring an amount of the pressurized flushing fluid supplied to the flushing chamber to assess a condition of a flushing fluid subsystem supplying the flushing fluid to the flushing chamber defined within a selected one of a plurality of annular seals.

10. The method of claim 6, wherein injecting the pressurized flushing fluid into the flushing chamber comprises maintaining the pressurized flushing fluid in the flushing chamber at a nearly constant pressure.

11. A method of operating a reciprocating plunger in a pump, comprising injecting a pressurized flushing fluid into a flushing chamber defined within a selected one of a plurality of annular seals disposed about the plunger in a fluid bore of the pump so that a pressure of the flushing fluid in the flushing chamber is greater than a pressure in a fluid cylinder of the pump during a retraction portion of the stroke performed by the plunger, wherein injecting the pressurized flushing fluid into the flushing chamber defined within a selected one of a plurality of annular seals comprises injecting the flushing fluid into the flushing chamber of a flushing cavity ring disposed adjacent to the fluid cylinder of the pump.

12. The method of claim 11, further comprising monitoring an amount of the pressurized flushing fluid supplied to the flushing chamber to assess a condition of the plurality of annular seals and a flushing fluid subsystem supplying the flushing fluid to the flushing chamber defined within a selected one of a plurality of annular seals.

13. The method of claim 11, wherein injecting the pressurized flushing fluid into the flushing chamber comprises maintaining the pressurized flushing fluid in the flushing chamber at a nearly constant pressure.

14. A reciprocating pump having a fluid end having at least one plunger configured to reciprocate along a linear axis within a fluid bore, the pump comprising:
   a plurality of annular seals disposed about the plunger;
   an annular retainer disposed circumferentially about the plunger and configured to energize and adjust a packing load of the plurality of annular seals; and
   wherein a selected one of the plurality of annular seals proximate to a fluid cylinder of the pump further having a flushing chamber in fluid communication with a flushing fluid port coupled to a one-way check valve allowing a pressurized flushing fluid to be introduced and retained within the fluid chamber and creating a pressurized fluid barrier to prevent frac fluid in the fluid cylinder from bypassing the selected one of the plurality of annular seals.

15. The pump of claim 14, wherein the selected one of the plurality of annular seals comprises a flushing chamber ring having the flushing fluid chamber and the flushing fluid port.

16. The pump of claim 14, wherein the plurality of annular seals comprises:
   a flushing chamber ring having the flushing fluid chamber and the flushing fluid port;
   a scraper having a plurality of ridges disposed next to the flushing chamber ring;
   a header ring encasing the scraper and disposed next to the flushing chamber ring;
   a pressure ring disposed next to the header ring;
   an adapter disposed next to the pressure ring;
   a spacer having an annular groove and disposed next to the adapter; and
   a lantern ring having a lubrication port in fluid communication with a lubrication fluid.

17. The pump of claim 14, wherein the plurality of annular seals comprises a flushing chamber ring having the flushing fluid chamber and the flushing fluid port and at least one of:
   a scraper having a plurality of ridges disposed next to the flushing chamber ring;

a header ring encasing the scraper and disposed next to the flushing chamber ring;
a pressure ring;
an adapter;
a spacer; and
a lantern ring having a lubrication port in fluid communication with a lubrication fluid.

18. The pump of claim 14, further comprising a sensor configured to measure a parameter associated with the pressurized flushing fluid supplied to the flushing fluid chamber to assess a condition of the plurality of annular seals.

\* \* \* \* \*